United States Patent
Edlinger

(10) Patent No.: US 6,660,223 B2
(45) Date of Patent: Dec. 9, 2003

(54) DEVICE FOR ATOMIZING LIQUID MELTS

(75) Inventor: Alfred Edlinger, Bartholomäberg (AT)

(73) Assignee: Holcim Ltd., Jona (CH)

( * ) Notice: Subject to any disclaimer, the term of this patent is extended or adjusted under 35 U.S.C. 154(b) by 112 days.

(21) Appl. No.: 09/959,060

(22) PCT Filed: Feb. 15, 2001

(86) PCT No.: PCT/AT01/00036

§ 371 (c)(1),
(2), (4) Date: Oct. 16, 2001

(87) PCT Pub. No.: WO01/62987

PCT Pub. Date: Aug. 30, 2001

(65) Prior Publication Data

US 2002/0158376 A1 Oct. 31, 2002

(30) Foreign Application Priority Data

Feb. 22, 2000 (AT) .............................................. 275/2000

(51) Int. Cl.[7] .................................................. C21C 1/00
(52) U.S. Cl. ........................................ 266/202; 266/225
(58) Field of Search ................................. 266/225, 202; 241/1; 65/202

(56) References Cited

U.S. PATENT DOCUMENTS

| 4,502,633 | A |   | 3/1985  | Saxon ....................... 239/132.3 |
| 4,993,691 | A |   | 2/1991  | Mousel ....................... 266/225 |
| 5,667,147 | A |   | 9/1997  | Edlinger ........................ 241/1 |
| 6,196,479 | B1 | * | 3/2001 | Edlinger ........................ 241/1 |
| 6,332,910 | B1 | * | 12/2001 | Edlinger ...................... 75/453 |

FOREIGN PATENT DOCUMENTS

| AT | 403 927 B    |   | 6/1998 |
| EP | 1190996 A2   | * | 9/2001 |
| WO | WO 99/42623  |   | 8/1999 |
| WO | WO 00/44942  | * | 8/2000 |

* cited by examiner

*Primary Examiner*—Scott Kastler
(74) *Attorney, Agent, or Firm*—Kevin E. Joyce

(57) ABSTRACT

In a device for atomizing liquid melts, in particular oxidic slags or glasses, including a slag tundish and an outlet opening into which a lance is immersed to inject gases or vapor while forming an annular gap, the lance (3) is comprised of two coaxial tubes (4, 5) which are separately displaceable in the axial direction and fixable in their respective axially displaced positions.

8 Claims, 2 Drawing Sheets

DEVICE FOR ATOMIZING LIQUID MELTS

This application is the National Phase of International Application PCT/AT01/00036, filed Feb. 15, 2001, which designated the U.S., and that International Application was not published under PCT Article 21(2) in English.

BACKGROUND OF THE INVENTION

1. Field of the Invention

The invention relates to a device for atomizing liquid melts, in particular oxidic slags or glasses, including a slag tundish and an outlet opening into which a lance is immersed to inject gases or vapor while forming an annular gap.

2. Prior Art

A number of proposals have been known for the atomization and granulation of liquid slags, in which liquid slags are discharged from a slag tundish into a cooling chamber via an outlet opening either in a free jet or are subsequently fed with vapor and/or cold water while still in the cooling chamber so as to enable rapid and intensive glassy solidification. In this context, also high-pressure cold water was proposed as a propellant jet in addition to vapor, inert gases being, of course, also suitable to eject liquid melts. If vapor is used as a propellant in such a process, it may happen with an accordingly intensive cooling that a negative pressure will form in the consecutively arranged cooling chamber by condensation. If cold water is used, the contact with liquid melts will cause rapid evaporation such that an overpressure may optionally build up there. As a result, different pressure conditions will prevail, particularly in the region of the outlet openings, whereby a negative pressure may form just as much as an overpressure in the region of the nozzle gap. In order to ensure the appropriate atomization adapted to the respective conditions and, above all, safeguard an accordingly fine atomization, it is, therefore, necessary to adapt the nozzle geometry to the respective conditions.

In the configurations known so far, the lance used to inject gases or vapor was arranged either above the liquid melt level and thus subjected to less wear, whereby the ejection characteristic naturally was highly dependent on the slag bath height or melt bath height, respectively. In configurations in which the lance is immersed in the liquid melt, accordingly high-temperature-resistant materials must, of course, be employed, whereby the observance of a defined jet geometry and a defined atomization is rendered difficult because solidification in the region of the outlet opening will bring about changes in the gap geometry and alterations in the grain size distribution of the atomized droplets.

SUMMARY OF THE INVENTION

The invention aims to provide a device of the initially defined kind, by which it is feasible in a simple manner to counteract the adhesion of a slag fleece due to solidification in the region of the outlet opening and by which it is feasible, at the same time, to adapt the desired jet parameters to the respectively prevailing conditions. To solve this object, the device according to the invention essentially consists in that the lance is comprised of two coaxial tubes which are separately displaceable in the axial direction and fixable in their respective axially displaced positions. Due to the fact that two coaxial tubes are provided, the inlet gap width for the liquid melt may be adjusted by means of the external tube by a relative displacement of these two tubes, whereas the desired jet parameters may be adapted to the respective preconditions such as, for instance, pressure or type of propellant jet medium by a suitable adjustment of the internal tube. In addition, it is feasible with such a lance design comprising two coaxial tubes to use different materials and provide, for instance, a sleeve or external tube of a high-temperature-resistant ceramic material or cost-effective graphite, while making the internal tube of the lance of an accordingly high-temperature-resistant steel or, likewise, of a ceramic material, being protected by the sleeve against excessive corrosive or thermal attacks by the melt. By using a sleeve as a wear part, it is feasible, in the main, to considerably reduce the operating costs of such a device and, at the same time, adjust the parameters for the desired droplet formation or jet formation within wide limits.

The use of graphite as a material for the sleeve is, of course, suitable only if carbon is insoluble in the melt to be atomized. This holds for melts that contain neither metals nor iron or chromium oxides. When using graphite as a material for the external tube, this will constitute a particularly cost-effective wear part which, at the same time, offers the opportunity to effectively counteract the closing up of the outlet opening.

Advantageously, the configuration according to the invention is devised such that the outlet opening in the form of a nozzle block and the external tube or sleeve are made of an electrically conductive material, in particular graphite, whereby, if also the nozzle block is made of an electrically conductive material, electric heating may be effected in a simple manner, for instance, by the formation of an electric arc between the sleeve and the nozzle block in the region of the inlet opening and the propellant jet feed so as to enable the assurance of a constant nozzle geometry during operation. When providing such heating in the region of the nozzle gap it is still feasible to make use of another important advantage of the configuration according to the invention. After all, it basically applies that the droplets or respective solidifying particles will become finer the higher the vapor temperature, this being due, inter alia, to an accordingly enhanced rheology of the droplets. However, high final vapor temperatures usually call for an accordingly cumbersome vapor generation and an accordingly demanding supply of high-temperature vapor to the lance. Due to the fact that the final heating or final superheating of vapor may be effected, for instance, by an electric arc, superheating of the vapor to a maximum of 1600° C. may be reached by substantially lower vapor temperatures and, for instance, vapor temperatures of about 700° C. at a maximum vapor pressure of 10 bars. The generation of vapor is, thus, accordingly more cost-effective, the temperature load on the vapor lance, thus, being strongly reduced. The superheating of "cold vapor" in the nozzle region, inter alia, will cause the lance itself to be relieved from vapor pressure, because in that region the pressure has already been converted into jet speed, the jet tube thus being subjected to a substantially lower thermal load.

According to another preferred embodiment, the central tube of the lance is made of a ceramic material or high-temperature-resistant steel, whereby the requirements for a precise jet geometry may be more readily observed. While thermal deformation and optionally even the melting off of the lance mouth has to be taken into account in conventional lances made of steel, it is feasible, by using a sleeve made of an accordingly temperature-resistant material, to keep the direct action of the slag away from the mouth of the central tube or internal tube such that the constancy of the jet geometry may be maintained over an extended period of time.

In a particularly advantageous manner, the configuration is devised such that the nozzle block comprises a conically designed inlet opening and an oppositely conical outlet opening diverging towards the mouth, whereby it is safeguarded that the inlet gap and the essential atomization parameters may be adjusted in a simple manner by appropriate axial displacement.

As already pointed out in the beginning, it is particularly advantageous if the geometry of the outlet opening is kept free of influences such as, for instance, closing up by solidification, and it, therefore, corresponds to a preferred embodiment that the nozzle block and the external tube or sleeve are connected with a power source to provide electrical heating in the region of the nozzle block.

If a significant rise in the atomization fineness is to be observed upon adjustment of the essential atomization parameters, the size of the atomized melt droplets may be reduced even further in that, as in correspondence with a preferred configuration, at least one annular nozzle is arranged coaxial with the outlet opening in a spraying chamber connected to the slag tundish, the axes of the nozzle outlet openings preferably being oriented substantially parallel with the axis of the lance, or in a diverging manner. In the region of the sprayed melt droplets emerging from the tundish through the outlet opening, thread formation cannot be prevented, which is due primarily to the elevated surface tension of the solidifying melt droplets. By arranging an annular nozzle within the spraying chamber, additional vapor and/or hot gases such as, e.g., combustion offgases may be ejected within the spraying chamber, heating the solidifying melt droplets up again upon contact therewith and, thus, enabling a decrease of the surface tension and a further reduction of the size of the droplets. Vapor or hot gases preferably are ejected in parallel with the axis of the lance, whereby a vapor or hot-gas jacket surrounding the outlet opening of the tundish is formed, which delimits the space available to the expansion of the sprayed melt droplets. The vapor or hot gas ejected from the annular nozzle will seize, in particular, the melt droplets present in the border region of the melt droplet jet emerging from the tundish, which were cooled most and, therefore, are the first to tend to thread formation. Advantageously, the configuration, therefore, is devised such that the annular nozzle comprises a duct for supplying vapor and/or hot gases particularly at a temperature exceeding the temperature of the emerging slag jet.

BRIEF DESCRIPTION OF THE DRAWINGS

In the following, the invention will be explained in more detail by way of an exemplary embodiment schematically illustrated in the drawing. Therein.

DETAILED DESCRITPION OF THE PREFERRED EMBODIMENTS OF THE INVENTION

Figure 1:
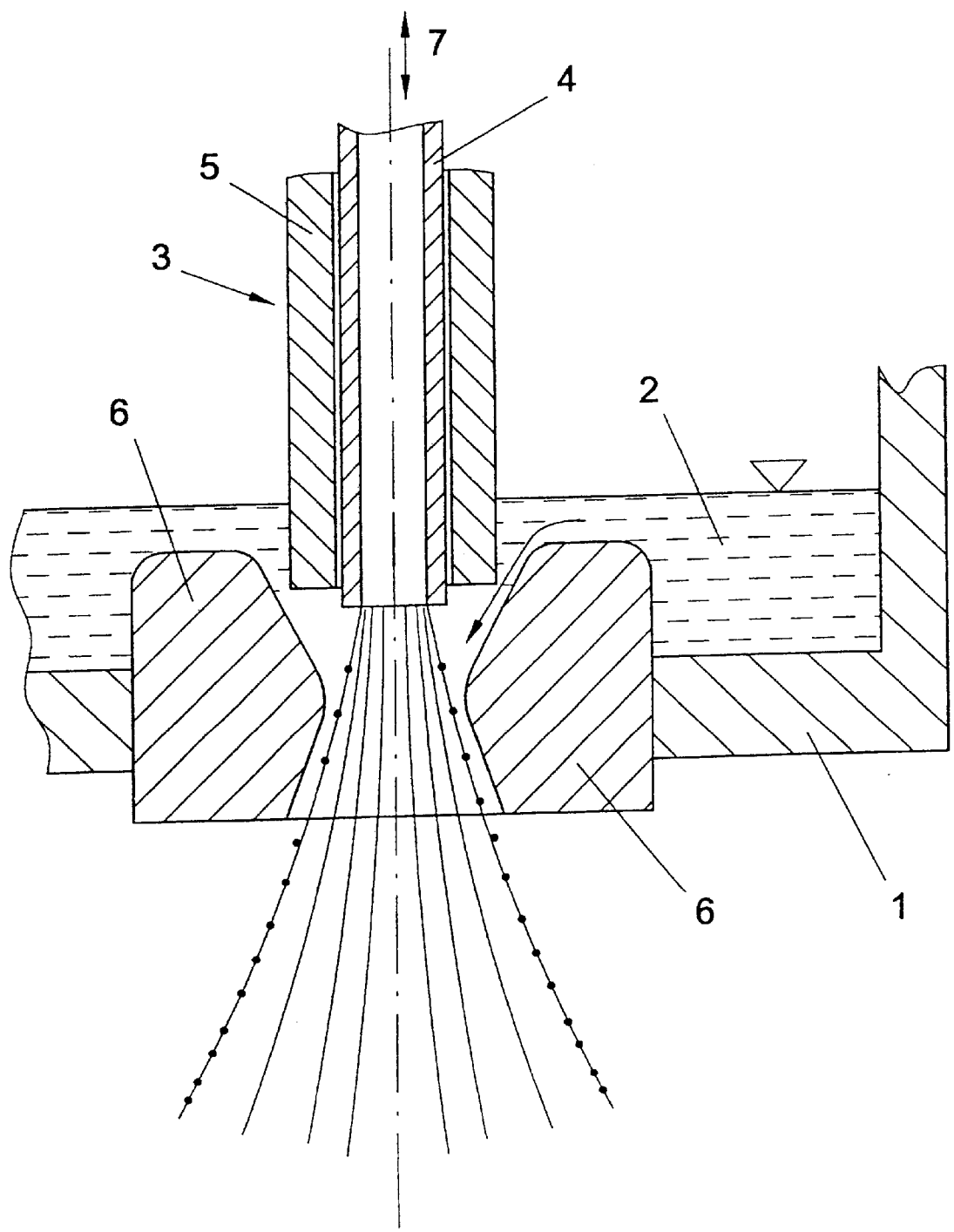
FIG. 1 is a partial view of a slag tundish including an outlet opening.

In FIG. 1, the bottom and a side wall of a slag tundish are denoted by 1. In the tundish is contained a molten slag 2 in which a lance 3 is immersed. The lance 3 is comprised of an internal tube 4 made of high-temperature-resistant steel and an external tube or sleeve 5 made of graphite. In the bottom of the slag tundish is arranged a nozzle block 6 which itself may again be made of graphite, wherein, when using graphite for the material of the sleeve 5 and the nozzle block 6, it merely has to be taken into account that the melt 2 will not contain any materials in which carbon is soluble. This holds, in particular, if the melt is no iron melt and if the melt contains neither iron oxides nor chromium oxides.

The two structural components of the lance 3, i.e., the internal tube 4 and the sleeve 5 may each be separately adjusted in height in the sense of double arrow 7. A displacement of the external sleeve 5, on the one hand, defines the width of the inlet gap for liquid melts. On the other hand, when using graphite for the material of the sleeve 5 and the nozzle block 6, a stable electric arc may build up between these two structural components acting as electrodes, so as to prevent the geometry and the definedly adjusted gap width from being affected by the solidification procedures. By displacing the central tube 4 of the lance 3, the geometry of the jet may be adjusted within wide limits and adapted to the respective propellant. In the main, it is feasible with such a lance comprised of two coaxial tubes to not only control thermal problems and corrosion problems, but also adjust a defined jet geometry capable of being maintained over an extended period of operation.

Figure 2:
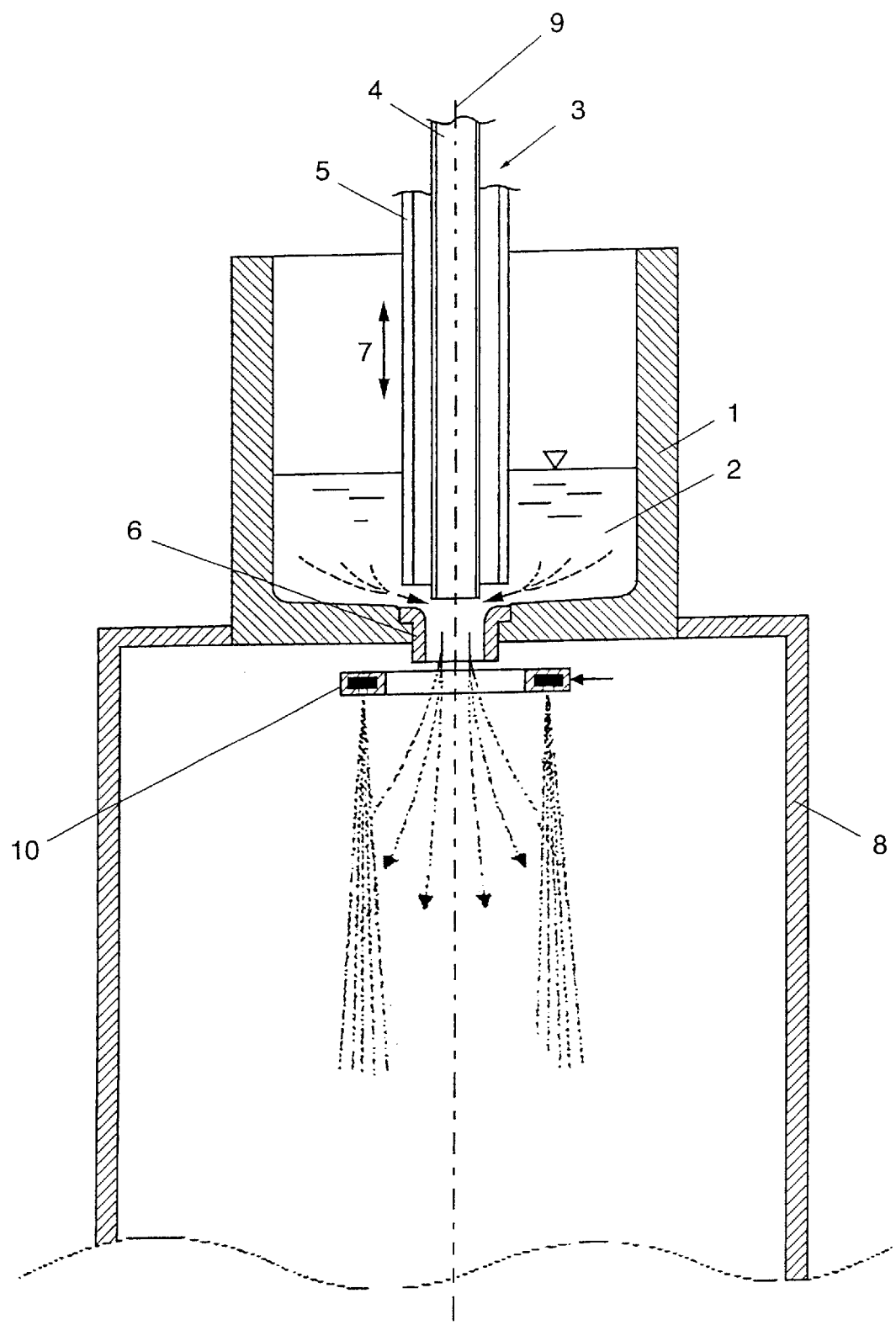
FIG. 2 depicts a slag tundish comprising a spraying chamber connected thereto.

FIG. 2 again depicts a slag tundish containing molten slag 2. An internal tube 4 of a lance 3, which is immersed in the slag, is again apparent, said internal tube 4 being surrounded by a safety tube 5. In the instant case, a spraying chamber 8 is connected to the slag tundish 1, whereby an annular nozzle ring 10 is arranged concentrically with the axis 9 of the lance. The vapor or hot-gas stream emerging from the annular nozzle ring 10 is oriented substantially parallel with the axis 9 of the lance 3, getting into contact with the outer region of the atomized melt droplets. Thereby, the melt droplets, which have already cooled down at least partially, are heated up again and, favored by the thus lowered surface tension, are further reduced and atomized. This enables an even finer atomization of the melt.

What is claimed is:

1. A device for atomizing liquid oxidic slag or glass melts; including a tundish into which a lance is immersed and an outlet opening from said tundish for injecting gases or vapors while forming an annular gap in said opening for passage of the melts, characterized in that the lance (3) is comprised of inner and outer coaxial tubes (4, 5) which are separately displaceable in an axial direction and fixable in respective axially displaced positions, said inner tube injecting said gases or vapor and the position of said outer tube relative to the opening defining the size of said annular gap.

2. A device according to claim 1, characterized in that the outlet opening, in the form of a nozzle block (6), and the outer tube (5) of the lance (3) are made of an electrically conductive material.

3. A device according to claim 1 or 2, characterized in that the inner tube (4) of the lance (3) is made of ceramic material or of a high-temperature-resistant steel.

4. A device according to claim 2, characterized in that the nozzle block (6) comprises a conically designed inlet opening and an oppositely conical outlet opening diverging towards the mouth.

5. A device according to claim 2, characterized in that the nozzle block (6) and the outer tube (5) are connected with a power source to provide electrical heating in the region of the nozzle block (6).

6. A device according to claim 1 or 2, characterized in that at least one annular nozzle is arranged coaxially with the outlet opening in a spraying chamber connected to the tundish.

7. A device according to claim 6, characterized in that the axis of a nozzle outlet opening in said at least one annular nozzle is oriented substantially parallel with the axis of the lance, or in a diverging manner.

8. A device according to claim 6, characterized in that said at least one annular nozzle comprises a duct for supplying vapor and/or hot gases at a temperature exceeding the temperature of the melt emerging from said outlet opening.

* * * * *